United States Patent [19]

Saito

[11] Patent Number: 5,210,900
[45] Date of Patent: May 18, 1993

[54] ROTARY WINDOW CLEANER

[75] Inventor: Shosaku Saito, Shizuoka, Japan

[73] Assignee: Saito Motors Co., Ltd., Shizuoka, Japan

[21] Appl. No.: 694,938

[22] Filed: May 2, 1991

[51] Int. Cl.⁵ .................................................. B60S 1/44
[52] U.S. Cl. ............................. 15/250.22; 15/250.14; 15/250.27; 464/161; 192/94; 403/359
[58] Field of Search ............ 15/250.14, 250.16, 250.17, 15/250.12, 250.22, 250.27, 250.28, 250.30; 464/160, 161; 192/94, 66, 70.23, 70.11; 403/359

[56] References Cited

U.S. PATENT DOCUMENTS

| | | | |
|---|---|---|---|
| 1,466,414 | 8/1923 | Taber | 464/161 |
| 1,640,894 | 8/1927 | Herbert et al. | 464/161 |
| 2,263,053 | 11/1941 | Schuler | 15/250.27 |
| 2,329,895 | 9/1943 | Hansen | 15/250.27 |
| 2,607,066 | 8/1952 | Morton | 15/250.22 |
| 2,888,119 | 5/1959 | Vissing | 464/161 |
| 3,025,552 | 3/1962 | Contont | 15/250.14 |
| 3,125,777 | 3/1964 | Leininger | 15/250.14 |
| 3,649,990 | 3/1972 | Saito | 15/250.22 |
| 3,829,924 | 8/1974 | Dittrich et al. | 15/250.14 |
| 3,919,734 | 11/1975 | Mosley | 15/250.22 |
| 4,665,488 | 5/1987 | Graham et al. | 15/250.12 |
| 4,701,972 | 10/1987 | Saito | 15/250.22 |
| 4,733,147 | 3/1988 | Muller et al. | 15/250.17 |
| 4,773,117 | 9/1988 | Saito | 15/250.22 |

FOREIGN PATENT DOCUMENTS

| | | | |
|---|---|---|---|
| 661302 | 11/1951 | United Kingdom | 15/250.14 |
| 950472 | 2/1964 | United Kingdom | 464/161 |
| 1051820 | 12/1966 | United Kingdom | 15/250.14 |
| 1070038 | 5/1967 | United Kingdom | 15/250.27 |
| 1391353 | 4/1975 | United Kingdom | 15/250.14 |

Primary Examiner—Harvey C. Hornsby
Assistant Examiner—Gary K. Graham
Attorney, Agent, or Firm—Bauer & Schaffer

[57] ABSTRACT

First and second rotary wipers which are disposed proximate with respect to each other so that a lag angle formed at the initiation of operation is held during operation thereof. The lag angle generated at the initial operation time is cancelled when the operation is stopped.

4 Claims, 5 Drawing Sheets

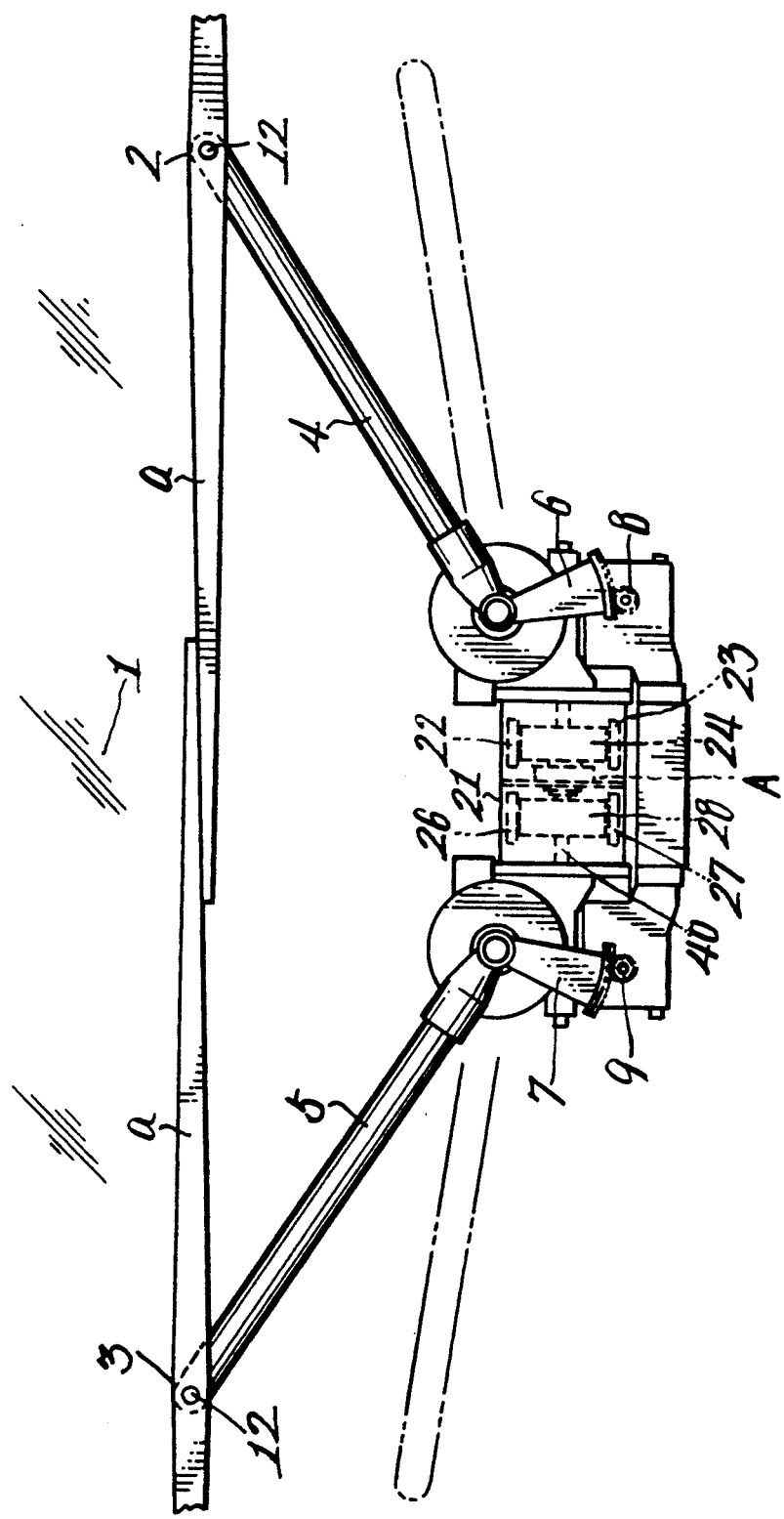

FIG. 2c.
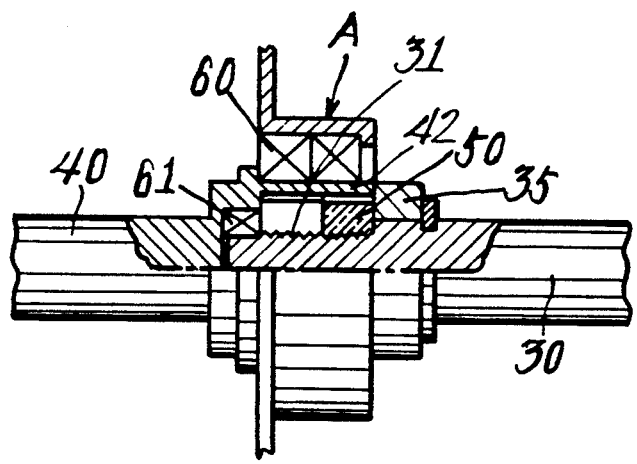
FIG. 2d.
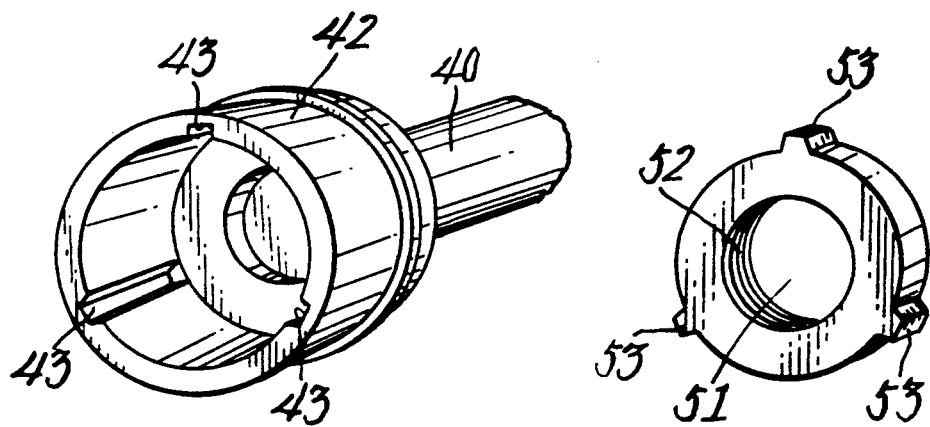
FIG. 2e.

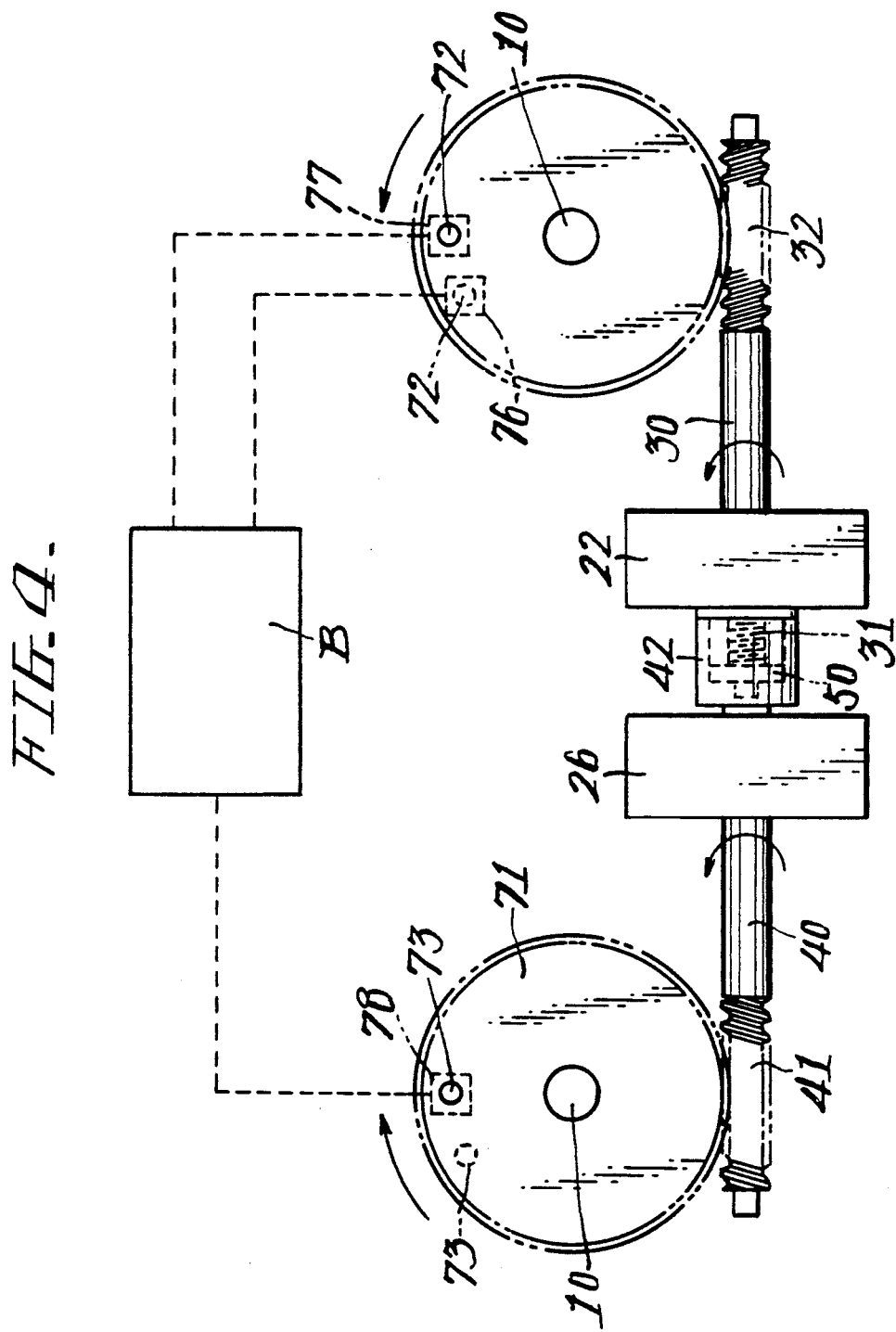

ROTARY WINDOW CLEANER

This invention relates to a rotary window cleaner having two wipers.

This kind of rotary window cleaner is described in U.S. Pat. No. 4,701,972 and is provided with a right wiper and a left wiper disposed proximate to each other. Rain and snow falling on the surface of a window pane of a vehicle are wiped away by rotation of the two wipers. In order to avoid interference between the right wiper and the left wiper, a lag angle is provided between a set position of the right wiper and a set position of the left wiper.

Since the driving source of the right wiper is the same as that of the left wiper, they are arrested when the wipers are stopped in a state holding the lag angle, thus preventing the elimination of the lag angle.

If the lag angle cannot be eliminated when the wipers are stopped, the field of view of the driver will be impaired, which will naturally cause him difficulty in driving the vehicle. Furthermore, when the wipers are not only stopped but are also not in use, the whole wiper assembly is lowered and stored in place beneath the window pane to hide it from view. In this case, if the wiper assembly is to be lowered while holding the lag angle between the right and left wipers, the distance required to lower the wipers is great and a large space is required.

SUMMARY OF THE INVENTION

It is, therefore, an object of the present invention to provide a rotary window cleaner which includes two separate driving sources, enabling, when properly controlled, the elimination of any lag angle and a reduction in space required for storing the wipers.

A rotary window cleaner according to the present invention includes a first motor having a driving shaft, a first wiper connected to the driving shaft of the first motor, a second motor having a driving shaft, a second wiper connected to the driving shaft of the second motor and disposed proximate to the first wiper, and a coupling mechanism for connecting and disconnecting the driving shaft of the first motor to and from the driving shaft of the second motor.

The rotary window cleaner according to the present invention includes a control mechanism for stopping the first wiper in a horizontal position and thereafter the second wiper likewise in horizontal position when it is instructed to stop the action of the window cleaner.

The coupling mechanism comprises a screw formed at one end of the driving shaft of the first motor, a cylinder disposed on the adjacent end of the driving shaft of the second motor, and a groove in which a planetary element fits. The planetary element is threadedly engageable with the screw portion of the driving shaft of the first motor and slidable along the groove formed on the cylinder portion disposed on the driving shaft of said second motor.

BRIEF DESCRIPTION OF THE DRAWINGS

The preferred embodiment of a rotary window cleaner according to the present invention is shown in the accompanying drawings, in which:

FIG. 1 is a front view of a rotary window cleaner;

FIG. 2c is a front view, partly in section, of the coupling mechanism, in which the planetary element is located on the side of a first motor;

FIG. 2d is a perspective view of the cylinder portion of the second driving shaft;

FIG. 2e is a perspective view of the planetary element

FIG. 4 is an explanatory view for explaining the control of the rotary window cleaner of the present invention.

DETAILED DESCRIPTION OF THE PREFERRED EMBODIMENTS

Figure 2A:
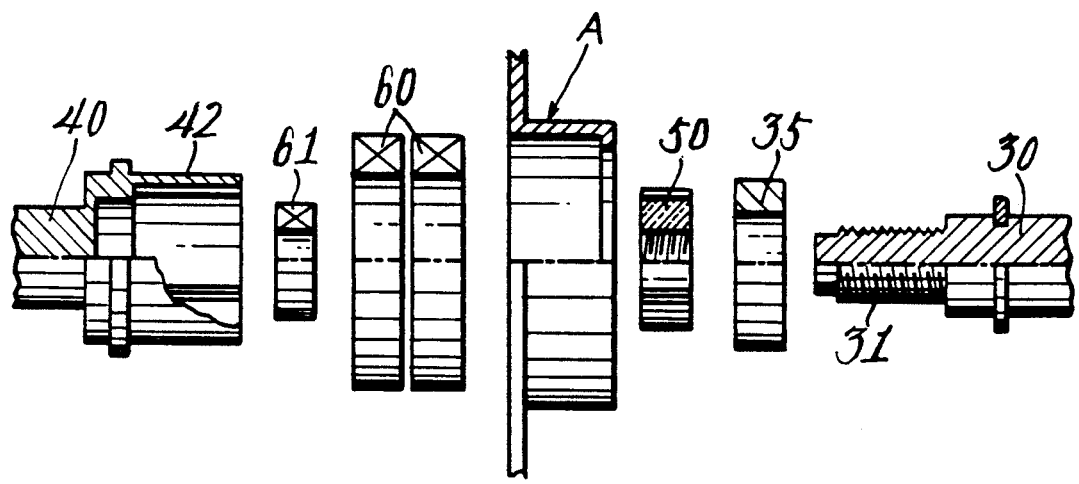
FIG. 2a is an exploded front view, partly in section, of the coupling mechanism.
Figure 2B:
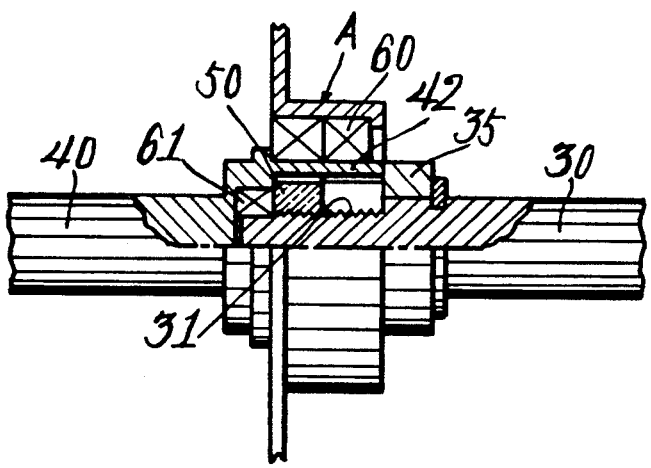
FIG. 2b is a front view, partly in section, of the coupling mechanism, in which the planetary gear is located on the side of a second motor.

In the drawings, the reference number 1 denotes a window pane disposed in front of the driver's seat of a vehicle. The front window pane 1 is connected at a lower end thereof with a back plate coplanar with the window and is provided with a water collecting groove which extends about a half of the rotary range of the wiper. The water collecting groove is provided with a drainage pipe mounted to a bottom portion thereof.

A first wiper 2 and a second wiper 3 each have a supporting rod, respectively, which is resiliently pressed against the window pane, and a wiping element formed of a flexible rubber or plastic movably supported on a supporting rod a. The arrangement is such that the wiping element is fully conformable with the curvature of the window pane and has a diameter able to wipe even the upper reaches of the window pane 1 on the rotation of the first and second wipers 2 and 3.

The first and second wipers 2 and 3 are supported by supporting cylinders 4 and 5. Each of the supporting cylinders 4 and 5 is provided, internally, with a transmission shown in FIG. 3. A gear is formed on lower ends of a lever-shaped control member 6, 7, respectively mounted to the supporting cylinders 4 and 5. Each gear is meshed with pinions 8 and 9. The supporting cylinders 4 and 5 can be raised or lowered in response to the rotation of the pinions 8 and 9, which can be driven by a driving source (not shown) such as motor, air, hydraulic, or the like.

The stator 23 of the first motor 22 is disposed within a motor case 21. The rotor 24 is also disposed within the motor case 21 so as to be opposite the stator 23. Likewise, the stator 27 of a second motor 26 is disposed within the motor case 21 and its rotor 28 is also disposed within the motor case 21 opposite to the stator 27. A connecting mechanism A is interposed between the first motor 22 and the second motor 26. The coupling mechanism A, as shown in FIGS. 2a through 2d and FIG. 4, selectively couples the driving shaft 30 of the first motor 22 with the driving shaft 40 of the second motor 26.

Screw portions 31 and 32 are formed at each end of the driving shaft 30 of the first motor 22. Similarly, a screw portion 41 is formed at the far end of the driving shaft 40 of the second motor 26 (See FIG. 5), while a cylinder hub portion 42 is formed on the near end thereof. A planetary element 50 is movably inserted between the hub portion 42 of the shaft 40 and the screw portion 31 of the shaft 30. The planetary element as seen in FIG. 2d has a central bore 51 formed with a female screw 52 with which the screw portion 31 formed on the driving shaft 30 of the first motor 22 is engaged. Projections 53 are formed on three places on the external edge of the planetary element 50 and fit into engagement with three grooves 43 formed in an inner surface of the cylinder portion 42. The driving shaft 30 of the first motor 22, with which the planetary element 50 is abutted, is provided with a bush 35 formed of, for example, gun metal, ceramics, or other material which is strong against friction. A bearing 61 abuts in contact with an inner peripheral portion of the cylinder portion 42, and a bearing 60 is also abutted with an external peripheral portion thereof.

Figure 3:
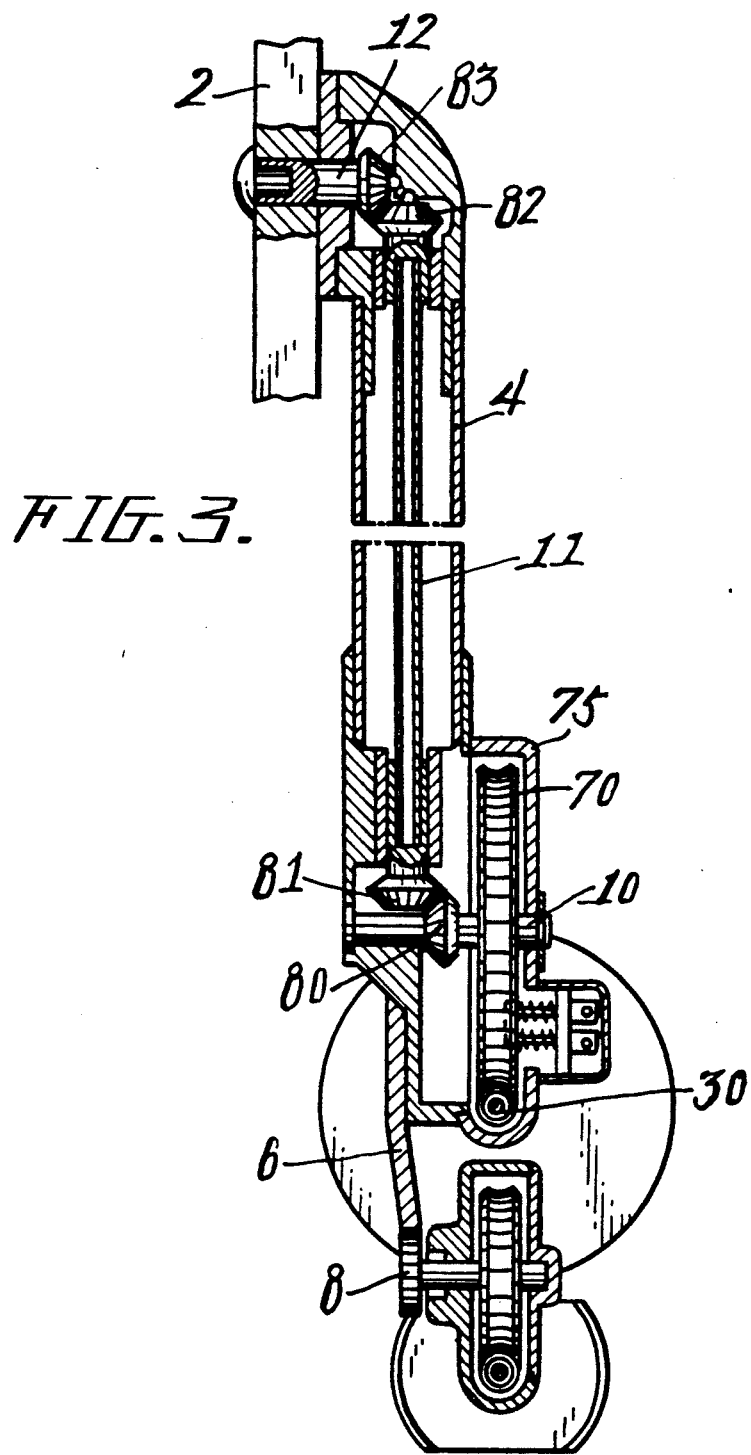
FIG. 3 is a sectional view of a supporting cylinder shown in FIG. 1.

The screw portions 32 and 41 at the ends of the driving shafts 30 and 40, respectively are threadedly engaged with enlarged gears 70 and 71, respectively, so as to reduce the speed of rotation of the driving shaft 30 of the first motor 22 and the driving shaft 40 of the second motor 26. The rotation of the gears 70 and 71 is transmitted to the first wiper 2 and second wiper 3 through the transmission mechanisms within the supporting cylinders 4 and 5. FIG. 3 shows the transmission mechanism disposed within the supporting cylinder 4. This transmission comprises a bevel gear 80 mounted on the rotary central shaft 10 of the gear 70 disposed in a gear case 75. A bevel gear 81 meshes with the bevel gear 80 and is, itself, mounted on one end of a relay shaft 11, which is disposed within the supporting cylinder 4. A bevel gear 82 is mounted on the other end of the relay shaft 11 and meshes with a bevel gear 83 mounted on a rotary drive shaft 12 for the first wiper 2. The supporting cylinder 5 is also provided with a similar transmission mechanism. The transmission is adjusted such that one full turn of the gears 70 and 71 forms one full turn of the first and second wipers 2 and 3, respectively.

The speed reduction gear 70 is provided with a magnet 72, while the corresponding gear 71 is provided with a magnet 73 (FIG. 4). Mounted on the gear case 75 is an operation lead switch 76 for generating a lag angle in the second motor 26 and a stop lead switch 77 for arresting the first motor 22. The gear case 75 is also provided with a stop lead switch 78 for the second motor 26.

As described in the foregoing, adjustment is made so that one full rotation of the gear 70 produces one full rotation of the first wiper 2, and one full rotation of the gear 71 produces one full rotation of the second wiper 3. Further, adjustment of the first wiper 2 can be made in such a manner that when the magnet 72 mounted on the gear 70 is brought to a position opposite the stop lead switch 77, the first wiper 2 assumes a horizontal state. Likewise, the second wiper 3 may be adjusted such that when the magnet 73 mounted on the gear 71 is brought to a position opposite the stop lead switch 78 of the second motor 26, the second wiper 3 assumes a horizontal state. In this state, both the magnets 72 and 73 are in position indicated by full lines in FIG. 4.

Accordingly, both the first wiper 2 and second wiper 3 are stopped in horizontal condition, as indicated by full lines in FIG. 1. The first and second wipers 2 and 3 may then be stored in storing positions indicated by chain lines with two dots in FIG. 1. By operating the pinions 8 and 9, the operating members 6 and 7 are caused to retract the cylinders 4 and 5, as indicated by the chain lines in FIG. 1.

When the first and second wipers 2 and 3 are operated upon actuation of a wiper operation switch (not shown), a control mechanism B effects the following control:

The pinions 8 and 9 rotate the operating members 6 and 7, raising the supporting cylinders 4 and 5 from the storing positions indicated by chain lines in FIG. 1. When the supporting cylinders 4 and 5 are raised to the predetermined positions as indicated by full lines in FIG. 1, the first motor 22 is rotated. When the first motor 22 is rotated, rotation of the first motor 22 is transmitted to the gear 70, the rotation of which is transmitted to the first wiper 2 through the transmission mechanism within the supporting cylinder 4, and, as a result, the first wiper 2 is also rotated.

At that time, since the second motor 26 (3000 rpm) is not rotated yet, the planetary element 50 (FIG. 2b) located on the driving shaft 40 of the second motor 26 is moved toward the first motor 22 along the groove portion 43 formed on the cylinder 42 and into abuttment (FIG. 2e) with the bush 36 mounted on the driving shaft 30 of the first motor 22.

Accordingly, when the first motor 22 is rotated, since the second motor 26 is still in a stopped state, the planetary element 50 of the connection mechanism A is moved toward the first motor 22 and connects the driving shaft 30 with the driving shaft 40.

Since the magnet 72 mounted on the gear 70 approaches the operation lead switch 76 of the second motor 26, disposed on the gear case 75, immediately before the planetary element 50 contacts the bush 35, the operation lead switch 75 of the second motor 26 is turned on, and, as a result, the second motor 26 starts rotating. Since the second motor 26 is already rotating immediately before the planetary element 50 engages the bush 35, impact of the planetary element 50 with the bush 35 is small.

When the first motor 22 starts rotating and the position of the magnet 72 of the gear 70 is brought to a position as indicated by broken lines in FIG. 4, the planetary element 50 engages with the bush 35 to regulate the movement of the planetary element 50. As a result, the driving shafts 30 and 40 are connected together through the projections 53 formed on the planetary element 50 and the groove portion 43 formed on the cylinder portion 42. The second wiper 3 is thus rotated late relative to the first wiper 2 to form the lag angle. That is, since the second motor 26 is kept stationary in order not to rotate the second wiper 3 until the planetary element 50 abuts with the bush 35, the second wiper 3 is rotated later than the first wiper 2 to the extent of that delay. When the driving shaft 30 is connected with the driving shaft 40 by the connection mechanism A, the driving source of the first and second wipers 2 and 3 becomes the same.

Even if during operation a difference in resistance of the window pane exists with respect to the first and second wipers 2 and 3 and even if the rotation of the first motor 22 (3500 rpm) is higher than the rotation of the second motor 26 (3000 rpm), the rotation of the first and second wipers 2 and 3 is the same. As a result of the difference in rotation, the second wiper 3 is delayed with respect to the first wiper 2, and the first and second wipers 2 and 3 rotate while holding the lag angle.

The rotation of the second motor 26 is transmitted to the gear 71, while rotation of the gear 71 is transmitted to the second wiper 3 through the transmission mechanism disposed with the supporting cylinder 4, and the second wiper 3 is rotated.

When the wiper stop switch of the rotary window cleaner is turned off, the magnet 72 mounted on the gear 70 approaches the stop lead switch 77 of the first motor 22 disposed in the gear case 75 and turns off the motor 22. In that state, the first wiper 2 is stopped in the horizontal state. Although the first motor 22 is turned off, the second wiper is kept rotating, and the magnet 73 mounted on the gear 71 of the second motor 26 approaches the stop lead switch 78 of the second motor 26 to turn off the second motor 26. In that state, the second wiper 3 is stopped in a horizontal state. Accordingly, both the first and second wipers 2 and 3 are stopped parallel to each other.

Since the distance of the screw portion 31 over which the planetary element 50 is permitted to move is properly adjusted in order to turn off the second motor 26 immediately before the planetary element 50 abuts with the bearing 51, impact of the planetary element 50 to the bearing 61 is small.

Since the second motor 26 is kept rotating even if the first motor 22 is stopped, the planetary element 50 is moved toward the second motor 26, and the connection mechanism for connecting the driving shaft 30 with the driving shaft 40 is released. As a result, the driving shaft 30 is disconnected from the driving shaft 40.

In a rotary window cleaner according to the present invention, since the driving shaft 30 of the first motor 22 can be connected to and disconnected from the driving shaft 40 of the second motor 26 by the connection mechanism, a lag angle can be formed between the first and second wipers 2 and 3 at the initial operation time of the rotary window cleaner. The driving source of the first and second wipers 2 and 3 can be made the same during operation, thus enabling to rotate the first and second wipers 2 and 3 while holding the lag angle, and the lag angle generated at the initial operation time can be cancelled when operation is stopped. Furthermore, since the first and second wipers 2 and 3 can be held in horizontal states when the wipers 2 and 3 stop operating, the wipers 2 and 3 may be stored in position beneath the window pane, the lowering distance of the wipers 2 and 3 being minimized and the storing space being reduced.

What is claimed is:

1. A rotary window cleaner including a first motor having a rotary driving shaft, a first wiper connected to said driving shaft for conjoint rotation, a second motor having a rotary driving shaft, a second wiper connected to said driving shaft of of said second motor for conjoint rotation, said second wiper being proximate to said first wiper, a coupling mechanism having means for connecting said driving shaft of said first motor to said driving shaft of said second motor when said wipers are rotatively driven and means for disconnecting said driving shaft of said first motor from said driving shaft of said second motor when said wipers are stopped, whereby said coupling mechanism permits the generation of a lag angle in one of said wipers relative to the other when said wipers are driven and eliminates the lag angle when said wipers are stopped.

2. The rotary window cleaner according to claim 1, including a control mechanism for sequentially stopping one of said wipers in a horizontal state and thereafter stopping the other wiper in a horizontal state.

3. A rotary window cleaner as claimed in claim 1, wherein said coupling mechanism comprises a screw portion formed at one end of the driving shaft of said first motor, a cylinder portion disposed to one end of the driving shaft of said second motor and provided with a groove portion, a planetary element threadedly engageable with said screw portion of the driving shaft of said first motor and slidable along said groove portion formed on said cylinder portion disposed on the driving shaft of said second motor, and a bush mounted on the driving shaft of first motor abutting with the planetary element upon the second motor being turned on.

4. A rotary window cleaner as claimed in claim 2, wherein said coupling mechanism comprises a screw portion formed at one end of the driving shaft of said first motor, a cylinder portion disposed to one end of the driving shaft of said second motor and provided with a groove portion, a planetary element threadedly engageable with said screw portion of the driving shaft of said first motor and slidable along said groove portion formed on said cylinder portion disposed on the driving shaft of said second motor, and a bush mounted on the driving shaft of first motor abutting with the planetary element upon the second motor being turned on.

* * * * *